United States Patent [19]

Smith et al.

[11] Patent Number: 6,031,623
[45] Date of Patent: Feb. 29, 2000

[54] COMPUTER SYSTEM WITH EVOLVING PRINTER

[75] Inventors: Marcus A. Smith, Boise; DeVerl N. Stokes, Eagle, both of Id.

[73] Assignee: Hewlett-Packard Company, Palo Alto, Calif.

[21] Appl. No.: 08/989,258

[22] Filed: Dec. 11, 1997

[51] Int. Cl.[7] .................................................. G06K 15/00
[52] U.S. Cl. ...................... 358/1.14; 358/1.01; 358/1.15; 358/1.16; 395/712
[58] Field of Search .......................... 395/101, 114–116, 395/712; 358/1.01, 1.14–1.16

[56] References Cited

U.S. PATENT DOCUMENTS

| | | | |
|---|---|---|---|
| 4,999,766 | 3/1991 | Peters et al. | 364/200 |
| 5,339,430 | 8/1994 | Lundin et al. | 395/700 |
| 5,339,435 | 8/1994 | Lubkin et al. | 395/700 |
| 5,515,536 | 5/1996 | Corbett et al. | 395/700 |
| 5,550,957 | 8/1996 | Davidson, Jr. et al. | 395/114 |
| 5,572,643 | 11/1996 | Judson | 395/793 |
| 5,636,333 | 6/1997 | Davidson, Jr. et al. | 395/114 |
| 5,844,554 | 12/1998 | Geller et al. | 345/333 |
| 5,870,534 | 2/1999 | Tsuchitoi | 395/115 |
| 5,870,544 | 2/1999 | Curtis | 395/187.01 |

*Primary Examiner*—Mark R. Powell
*Assistant Examiner*—Lance W. Sealey

[57] ABSTRACT

A computer system includes a computer and a peripheral the peripheral having an object oriented run-time environment (e.g., JAVA) and object resource brokering facilities (e.g., CORBA). Public methods of the peripheral are exposed to objects of the computer system and vice versa for more efficient peripheral operation and shared program code.

20 Claims, 7 Drawing Sheets

COMPUTER SYSTEM WITH EVOLVING PRINTER

FIELD OF THE INVENTION

This invention relates to printers and to methods of expanding printer capabilities in response to evolving printer and computer system requirements.

BACKGROUND OF THE INVENTION

Computer systems including those used by office workers, technicians, and scientists are subject to frequent change. Some change is attributable to improvements that make the computer system perform more closely to goals of a predetermined computer system specification. Other change is attributable to improvements beyond the scope of the original specification, for example when users' expectations change as to what the computer system ought to be able to do. Rapid application of new technologies has caused users to consider components obsolete when desirable functions, which were not part of the original component, cannot be added.

The conventional computer system includes a general purpose computer component having memory and processing resources tightly coupled within one enclosure. Other components, as for example input/output equipment, are conventionally packaged in other separate enclosures. These separately enclosed computer system components, known as "peripherals," have grown in complexity so that some, including laser printers, for example, include a special purpose computing circuit with considerable internal memory and processing resources dedicated to the execution of a special purpose operating system and a peripheral program.

General purpose computing components (computers) and input/output equipment (printers, scanners, etc.) are developed and marketed by independent suppliers. Functional cooperation of a computer and peripheral conventionally relies on driver software, running on the computer, to operate the peripheral in an efficient manner. Poor quality operation may result when driver software is unable to take advantage of peripheral functions embedded in the peripheral program. As a case in point, poor printing quality may result when driver software is unable to pass geometric graphic image items such as circles to the printer, renders graphic image items into bit-map form, and passes only bit-map data to the printer. No advantage is taken of edge enhancement functions of the peripheral program in such a case.

The peripheral program code is conventionally stored in nonvolatile memory in directly executable format. The peripheral program's capabilities are evidenced as functional aspects (functions) of the peripheral. To modify or add functions, nonvolatile memory components are added or installed in place of original memory components. These added components provide additional stored, directly executable, program code. Some functions, such as the ability of a laser printer to print in a particular font, are defined in nonexecutable format. To modify or add such functions, preprogrammed nonvolatile memory components are installed or data is transferred across an electrical signal interface to be stored in volatile memory. Such transfer is conventionally called downloading.

The address space of a conventional special purpose computing circuit is limited to one or a predetermined few regions for nonvolatile memory and one or a predetermined few regions for volatile memory. When additional functions are installed, the peripheral program scans the address space to identify installed and downloaded program code and data for incorporation into the peripheral program and, consequently, into the functional aspects of the peripheral.

Peripherals are said to "evolve" as a result of modifying or adding functions because the new or modified functions are often, though not necessarily, related to one or more originally provided functions. Because computer systems are subject to frequent change, it is desirable to meet such change with peripherals that are capable of evolving with less difficulty. Difficulties include the installation of physical memory components, the time consumed in downloading, and the limitations of address space in conventional systems. These difficulties significantly increase costs associated with computer systems including the cost of ownership in a changing environment and the cost of maintaining a system that meets changing specifications.

In view of the problems described above and related problems, the need remains for systems and methods that facilitate functional evolution for printers.

Further technical background includes: "Developing Client/Server Applications," by W. H. Inmon, QED Publishing Group of Wellesley Mass., 1993; "RPC for NT," by Guy Eddon, R&D Publications of Lawrence Kans., 1994; and "Object-Oriented Languages, Systems and Applications," edited by Gordon Blair, et al., Halsted Press of New York N.Y., 1991; "Advanced Windows NT," by Jeffrey Richter, Microsoft Press of Redmond Wash., 1994; "Learn Java++ Now," by Stephen R. Davis, Microsoft Press of Redmond Wash., 1996; and the bibliographic references contained therein.

SUMMARY OF THE INVENTION

Accordingly, a data storage medium in one embodiment of the present invention includes a data storage medium and indicia recorded on the medium. The indicia include instructions for performing on a provided printer a first method for functional evolution of the printer, coupled to a provided computer. The printer has a printer function. The first method includes (1) receiving at the printer a class definition which includes a second method for image processing; (2) forming an object instance in response to the class definition; and (3) binding the object so that the printer function is performed according to the second method, thereby accomplishing functional evolution.

According to a first aspect of such an embodiment, the printer's capabilities, i.e. the functional aspects of the printer function, are expanded when the printer function is performed according to the second method.

According to a second aspect, functional evolution is effected without introduction of software development techniques such as conventional compiling, linking, and loading, greatly simplifying expanded printer functions.

According to another aspect, instantiation and binding are accomplished without direct reference to the address space of the printer. Therefore, limitations on address space are easier to avoid.

According to yet another aspect, when instantiation and binding are accomplished by temporary allocation of memory that is later freed for other purposes, the evolution of separate functions can be accommodated at separate times without memory address limitations.

According to still another aspect, the class definition can be received at the printer by data communication or by conventional installation of preprogrammed memory devices. Functional evolution, according to such an embodiment, can be accomplished with any combination of so-called "plug and play" and data communication.

According to a further aspect, binding permits performance of the printer function according to the second method. When the printer function includes a call to the second method, the second method can override a similarly named method of the printer function, or provide additional (supplemental) functional capability. When the second method includes a call to the printer function, the printer function can conditionally override a portion of the second method, or provide additional (supplemental) functional capability. In all of these cases, functions of legacy software such as the printer function evolve without recompiling the legacy software.

Another embodiment of the present invention provides a method of printing on a printer. The printer includes a first class definition having a function. The method includes: (1) exchanging a second class definition between the printer and a computer; (2) instantiating at the printer an object of the second class definition; (3) binding the object so that the function is performed when reference is made to the object; and (4) printing in response to the performance of the function.

According to a first aspect of such a method, the computer and printer cooperate after common recognition of the second class definition regardless of whether the second class definition was prepared by the printer or the computer. When the second class definition is prepared by the computer, additional methods such as video graphics rendering methods, can be added to the second class. When the second class definition is prepared by the printer, currently installed methods such as printed graphics rendering methods, can be added to the second class. What results is more accurate representation on a video display of images to be printed and more accurate representation on a printer of images displayed on a video monitor. Such consistency between a monitor and a printer provides a desirable improvement to the so-called what-you-see-is-what-you-get (WYSIWYG) systems capability.

According to another aspect, improvements in image processing for video systems and for printer systems are shared. For example, an improved method of video rendering becomes available for printer rendering and vice versa.

A computer system in yet another embodiment of the present invention includes a computer and a printer. The computer has stored indicia of a method for processing images to be displayed on a provided monitor. The computer forms a class definition in response to the indicia and transmits the class definition to the printer. The printer includes a class loader. The printer receives the class definition, performs the method, and prints in response to the method.

According to an aspect of such a computer system, a printer with a class loader can print using a method provided by the computer. Computation involved in the method is accomplished by the printer, reducing the computational burden at the computer.

According to a second aspect, replacement of the printer with a second printer having an equivalent class loader does not involve change at the computer. Computer system evolution is simplified.

BRIEF DESCRIPTION OF THE DRAWING

A preferred exemplary embodiment of the present invention is described below with reference to the drawing in which.

DETAILED DESCRIPTION OF THE PREFERRED EMBODIMENT

The present invention may be embodied in any system that includes an evolving printer. Such a system suitably includes any group of components that interact to accomplish a computational or measurement task. For example, computer system 100 of FIG. 1 includes subsystems at sites 102, 104, and 106, coupled by conventional network links 116, 122, and 140 to accomplish various conventional office automation tasks. Subsystem 102 includes personal computer (PC) 110, printer 112, and net interface 114. Subsystem 104 includes server 126, a local (or wide) area network 122, net interfaces 130 and 132, one or more personal computers 120, one or more printers 124, and one or more printers 134. Subsystem 106 includes net interface 142 and printer 144.

Figure 1:
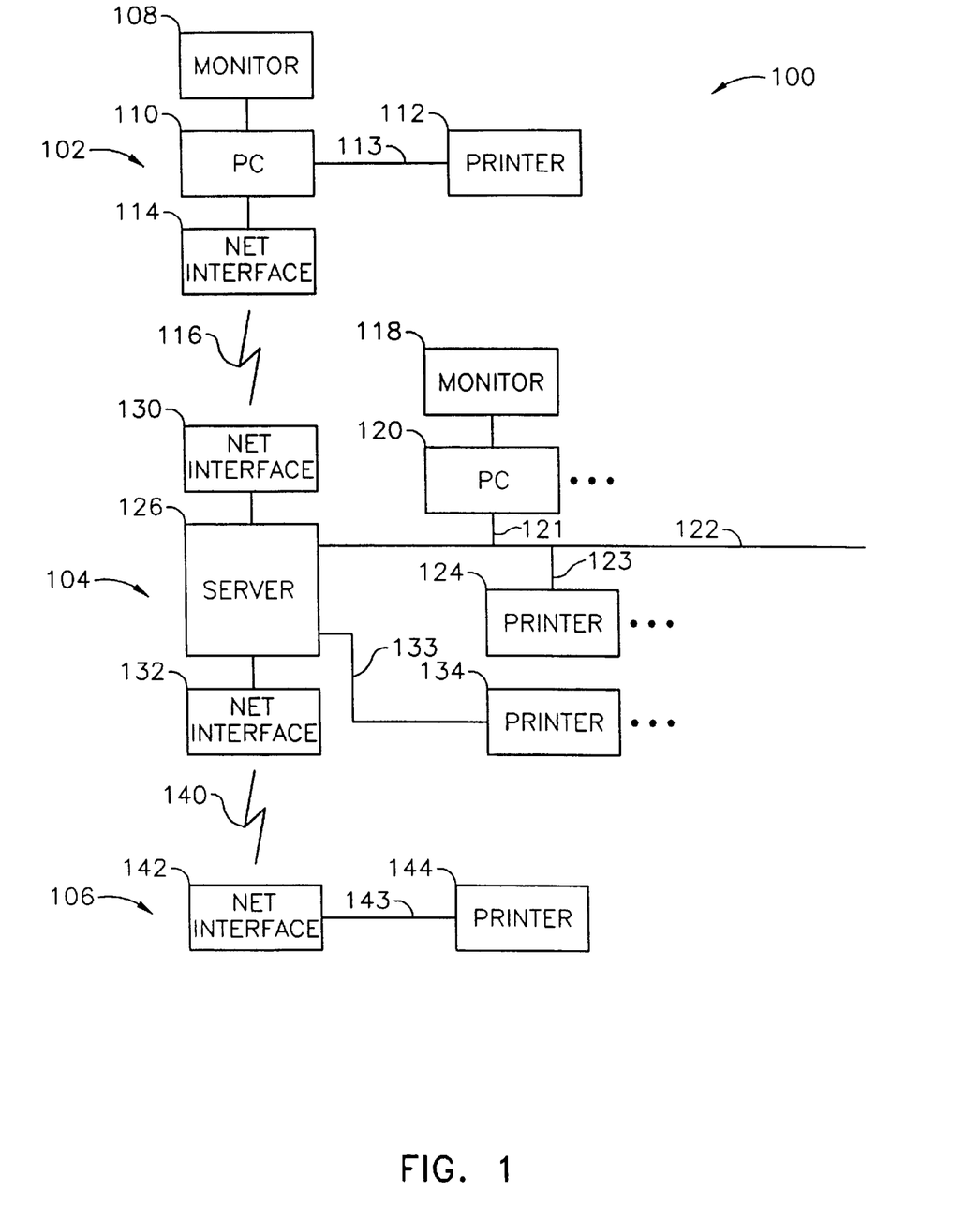
FIG. 1 is a block diagram of a computer system in one embodiment of the present invention.

In computer system 100, printing is accomplished with an evolving printer 112, 124, 134, and 144 at each of several sites 102, 104, and 106. Printers 112, 124, 134, and 144 represent any printing device using conventional technology including, for example, a laser printer, an ink jet printer, an impact printer, a photographic printer. Each printing device suitably serves any application for an output device including, for example, a computer output printer, an instrumentation recorder, an office copier, a FAX machine, and a label or receipt printer.

Personal computers 110 and 120 and server 126 suitably include conventional keyboard and disk drive components (not shown) and a conventional monitor 108 and 118. In a conventional PC, scan lines are communicated across an electrical interface between the computer and monitor. In many computer systems, this interface does not include provisions for use as a network link. Therefore, the signaling frequency and data bandwidth are selected to tightly couple the computer and monitor, with the result that the monitor is dedicated to a single computer.

In contrast, each printer 112, 124, 134, and 144 is coupled to other components of system 100 by a link 113, 123, 133, and 143, respectively. Each printer receives information governing printing and provides status of printer operations through the link. Links 113, 123, 133, and 143 employ one or more physical connections with corresponding network link functions to support dedicated or shared services with various data communication protocols. Each printer 112, 124, 134, and 144 is capable of evolving functions, permitting the same printer to be attached to any link 113, 123, 133, or 143 and operate without manual intervention.

Links 113, 123, 133, and 143, and net interfaces 114, 130, 132, and 142 suitably include any conventional circuit for satisfying the physical and electrical demands of data communication for a particular channel. Channels include any communication medium, for example, electrical and optical cable, audio signaling (telephony), radio frequency, and infrared. In a conventional net interface, one or more levels of protocol are accomplished, for example, collision detect multiple access, time domain multiplexing, and packet switching protocols. If desired, link and net interface support may be incorporated into the equipment to which each is connected. For example, printer 144 and net interface 142 may be combined physically and electrically into one item.

A computer system of the present invention further includes any distributed processing application program that facilitates functional evolution of an evolving printer. A distributed processing application program suitably includes any suite of computer program files and data files that cooperate to perform a function across a link or net interface. For example, computer system 100 of FIG. 1 includes suitable files that perform methods of the present invention to be described below with reference to FIGS. 2, 3, and 4. These methods solve the problems discussed above by facilitating functional evolution for evolving peripherals.

Figure 2:
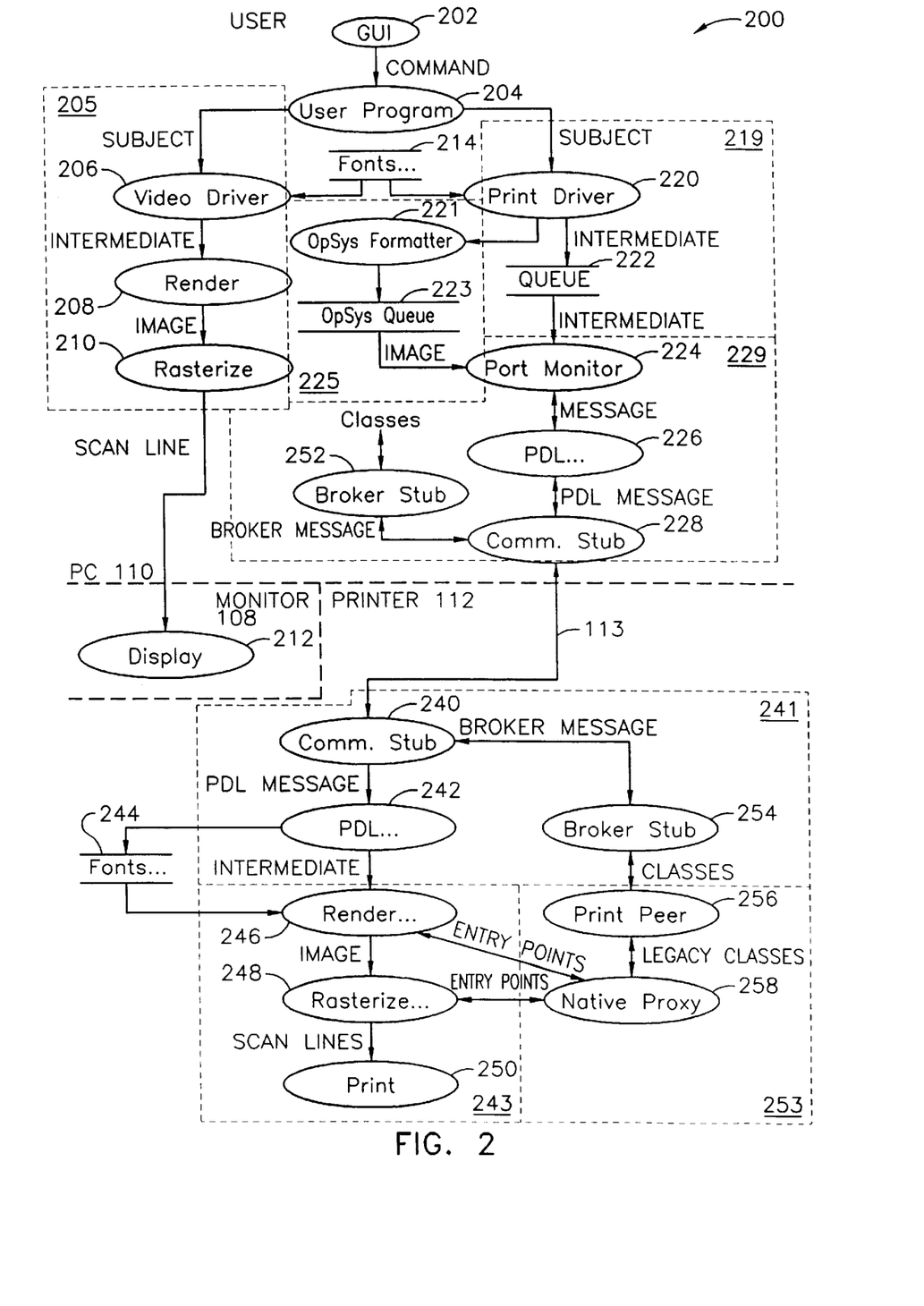
FIG. 2 is a data flow diagram for a method of displaying and printing using a first portion of the computer system of FIG. 1.
Figure 3:
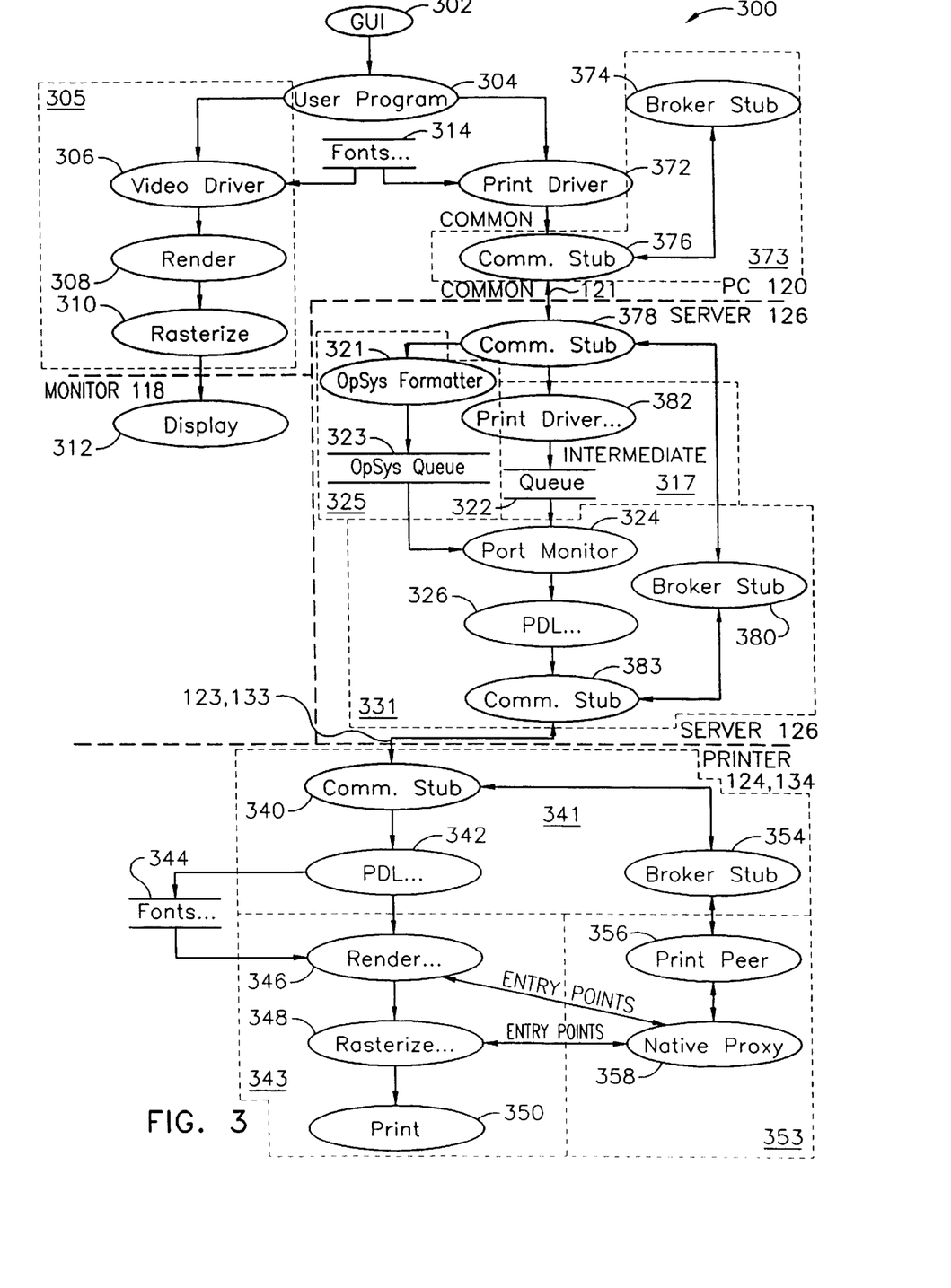
FIG. 3 is a data flow diagram for a method of displaying and printing using a second portion of the computer system of FIG. 1.
Figure 4:
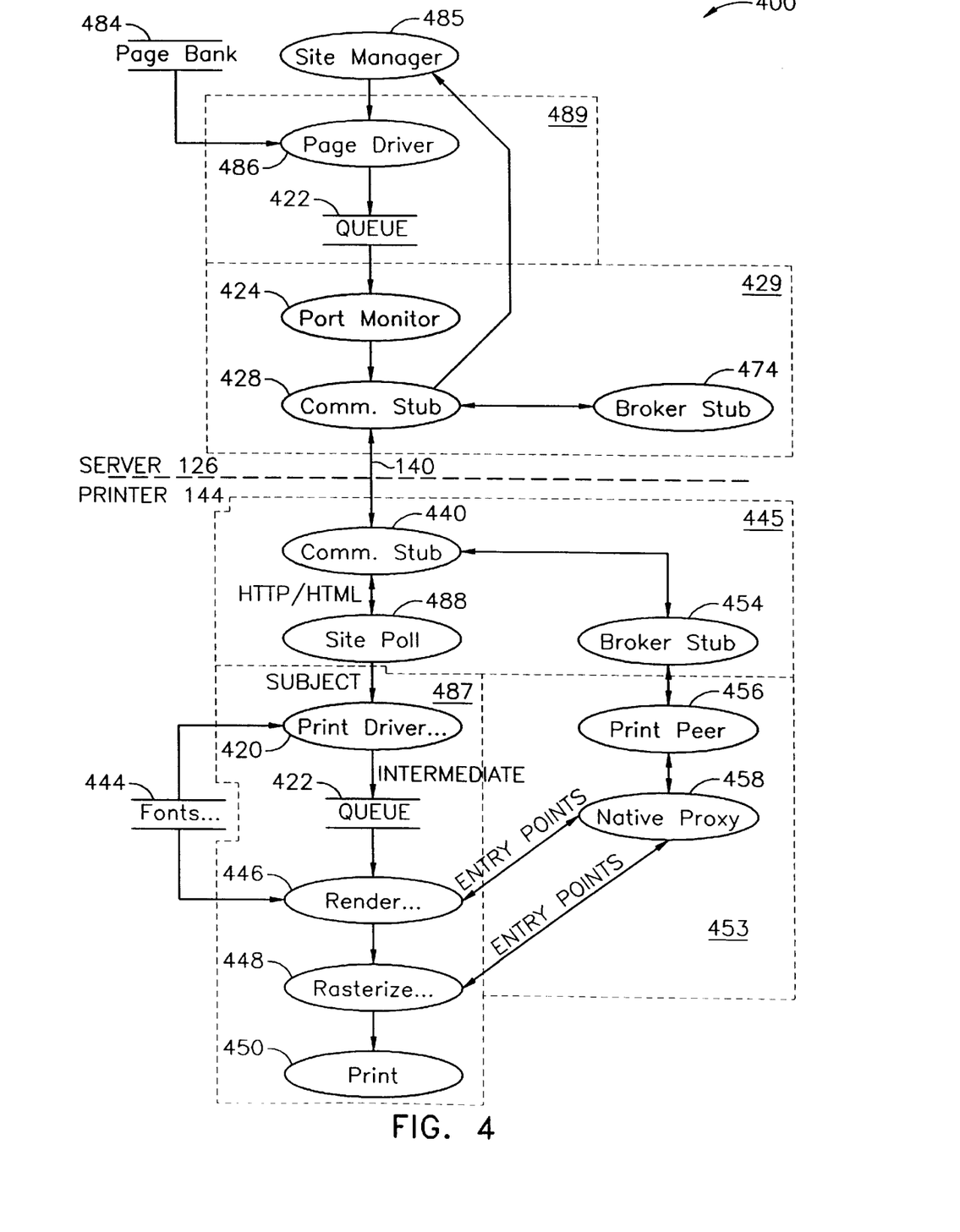
FIG. 4 is a data flow diagram for a method of displaying and printing using a third portion of the computer system of FIG. 1.

The particular configuration of a distributed processing application program may be the result of an ad hoc arrangement of components independently developed by various suppliers wherein each component conforms to predetermined interfaces to permit cooperation as a distributed processing application program. Components of software systems 200, 300, and 400 may be implemented in software (for example, machine code such as Intel Pentium Assembly language, or bytecode such as Java P-code), in firmware, by general purpose circuits, by state machine circuits, or any combination of these conventional techniques.

The component processes and data items of software systems 200, 300, and 400 may be supplied by more than one vendor. For example, processes 202, 206, and 220 may be supplied by an operating system vendor; process 204 and data items 214 and 244 may be supplied by a word processing application program vendor; processes 208, 210, and 212 may be provided by a monitor vendor; process 228 may be supplied by a network vendor; and processes 224, 226, and 240–256 may be supplied by a printer vendor. The user conventionally relies on the cooperation of particular component processes selected ad hoc and with reliance on predefined interfaces between these components.

A first distributed processing application program is any program that facilitates evolving functions for a PC linked with a printer. For example, software system 200 of FIG. 2 facilitates evolving functions for PC 110, link 113, and printer 112. Software system 200 includes a suite of component processes and data items in PC 110 and printer 112. In PC 110, software system 200 includes graphical user interface (GUI) 202, user program 204, video pipe 205, operating system print pipe 225, PC print pipe 219, PC font data 214, and PC communication process 229. In printer 112, software system 200 further includes printer communication process 241, printer font data 244, printer print pipe 243, and access process 253.

Software system 200 may include any conventional user interface, for example, GUI 202. A user interface accepts direction from a user and provides a command that invokes display or printing of data. GUI 202 is of the type provided by an operating system, such as a Windows operating system marketed by Microsoft of Redmond, Wash.

Software system 200 may include any conventional user program 204, for example a word processor or computer aided design program. Such a user program accepts the command to display or print data from memory or from a file on disk. User program 204 identifies, by conventional techniques, the subject matter to be printed. For the purpose of illustration in the discussion below, the subject includes text in scalable fonts and overlapping graphics images. Other, more or less complex, subject matter may be identified for display or printing.

A video pipe includes one or more processes that reformat data identified for display into scan lines for presentation on a raster display device, such as monitor 108. For example, video pipe 205 includes video driver 206, render process 208, and rasterize process 210. A video driver prepares a data in an intermediate format from the subject. For example, video driver 206 prepares intermediate data by conventional techniques, in bit-map format from subject data in vector, symbol, outline, position and control, or bit-map formats. Driver 206 includes methods for creating commonly used bit-map images such as lines, geometric shapes, and text characters from conventional algorithmic and parametric definitions.

A rendering process integrates (paints) intermediate data on an image data structure. For example, render process 208 prepares a bit-map image data structure by conventional techniques from intermediate data describing portions of an image requiring further processing. Such processing may include compensation for matters of screen composition including overlapping images, images that extend beyond the allowed display area, edge or color enhancement, scale, orientation, shadowing, or animation. Bits in the image data structure correspond generally to pixels to be displayed.

A rasterizing process provides data in scan lines from an image data structure. For example, rasterize process 210 provides binary pixel intensity values sequentially, by conventional techniques, for each horizontal scan line of each color plane used by monitor 108. Rasterize process 210 may account for matters of screen size, persistence, or brightness. Raster process 210 may include methods for converting some or all of the received image data structure into vectors for display on a compatible monitor in place of monitor 108. If desired, processes 208 and 210 may be combined by conventional techniques to reduce the amount of memory needed to retain image data structures.

A display process receives output from a video pipe and operates any conventional display device including, for example, storage tube, cathode ray tube, liquid crystal, or field emission display. For example, display process 212 in monitor 108 receives scan lines from video pipe 205 for conventional graphics raster display. Display process 212 maintains the image on monitor 108 until replaced in whole or in part by a new image.

For printable subjects, it is desirable to accomplish a printed result that closely resembles the image as it would be displayed on a monitor. According to the present invention, processes used in preparing to print are permitted to use the processes discussed above for preparing to display.

A print pipe includes one or more processes that reformat data identified for printing into a format for communication across a link to a printer, such as printer 112. For example, operating system (OpSys) print pipe 225 includes OpSys formatter 221 and OpSys Queue 223 that provide data in bit-map image format to port monitor 224. OpSys formatter 221 and OpSys queue 223 are of the type that are integral to an operating system for supplying default printing capability, for example, a print pipe of the Windows 32-bit operating system marketed by Microsoft. Such a print pipe may be set to render all items, as in the case of support for Java Developer's Kit (JDK) 1.1.x.

A print pipe that supports evolving printer functions performs a minimum of reformatting operations prior to supplying data to be communicated over a link to a printer. For example, PC print pipe 219 includes print driver 220 and queue 222 that provide data in one of several formats to print monitor 224. In addition, print driver 220 responds to defaults or user input to direct printing of the identified subject data through either OpSys print pipe 225 or to process the identified subject data without leaving print pipe 219 for supporting evolving printer functions.

When data is directed to OpSys print pipe 225, the subject data is rendered by OpSys formatter process 221 to provide a bit-map data structure as described above for video driver process 206 and render process 208. OpSys formatter 221 may include methods for creating commonly used bit-map images such as lines, geometric shapes, and text characters from conventional algorithmic and parametric definitions. The resulting bit-map data structure is provided to port monitor 224 for communication across link 113.

On the other hand, when the subject data proceeds through print pipe 219, print driver 220 takes advantage of the capabilities of and accommodates the limitations of printer 112. For example, for image items that can be rendered by printer 112, print driver 220 reformats the subject data to provide to port monitor 224 either identification or definition information in any format compatible with intervening communications processes and printer 112. For image items that printer 112 cannot render, print driver 220 reformats the subject data into intermediate format as described above. Print driver 220 may include methods for creating commonly used bit-map images such as lines, geometric shapes, and text characters from conventional algorithmic and parametric definitions. The resulting bit-map data structure is provided to port monitor 224 for communication across link 113.

By foregoing conversion to a bit-map intermediate format and foregoing a rendering process, print driver 220 delivers more compact data to port monitor 224 for efficient communication. Consequently, PC 110 is relieved from the processing burden of rendering data to be printed, memory in PC 110 is better utilized, and printer 112 is permitted to efficiently render and rasterize according to methods specifically configured for printer 112.

Font data bases 214 and 244 include any conventional font data structures. Video driver 206 and print driver 220 obtain information for specifying text characters from font data base 214. Information in font data base 214 is extensible from, and shared with, font data base 244 in printer 112 as indicated by the ellipsis on both 214 and 244 in FIG. 2.

A print queue stores data for sequentially requested print jobs. A print queue buffers data in a generally first in first out protocol and may provide management functions for the contents of the queue. For example, OpSys queue 223 includes storage space for large intermediate data structures and provides complex monitoring, cancellation, and priority control to manage data flow. Data remains in OpSys queue 223 from a time when rendering of a first of several related subject data items begins until communication of the last related subject data item is successful. This period of time is made long by the complexity of rendering and the duration of communicating large intermediate data structures.

In contrast, queue 222 includes storage space generally used for image items (such as a geometric shape, a scalable font character, an overlaid graphic with shading, etc.) to be identified or defined rather than rendered within the PC 110. An item is identified by any reference, for example a character number reference within the context of an identified fixed size font. An item is defined by any data structure setting forth parameters for an algorithmic rendering, for example a shaded rectangle or a scalable character of particular point size, weight, and color. In a preferred embodiment, queue 222 is omitted because port monitor process 224 can keep pace with the output of print driver process 220.

A communication process is any program that assists the transfer of data across a link. For example, communication process 229 assists the transfer of data in intermediate format, image bit-map format, class definitions, broker messages, communications status messages, and communication control messages across link 113. Communication process 229 in PC 110 includes port monitor 224, page description language (PDL) process 226, communication stub 228, and broker stub 252. Communication process 241 in printer 112 includes communication stub process 240, PDL process 242, and broker stub 254.

A port monitor communicates status, commands, and data to a printer. For example, port monitor 224 communicates with printer 112 by sending and receiving messages through PDL process 226 and maintenance processes not shown. A maintenance process reports status of the printer including condition of media supplies, current configuration details, paper jams, etc. Maintenance messaging is accomplished, for example, using the conventional Simple Network Management Protocol (SNMP). Port monitor 224 receives data from OpSys print pipe 225 and from PC print pipe 219, assembles messages from these data according to a conventional message protocol and passes each message to the PDL process.

A page description language (PDL) is a protocol for data transfer with a printer. A PDL provides both graphics and text communication capability and includes identification and definition of fonts 244. Conventional PDLs include the Printer Control Language (PCL) language marketed by Hewlett Packard Co. of Palo Alto, Calif., Postscript language marketed by Adobe of San Jose, Calif., and IPDS marketed by International Business Machines of Boca Ratan, Fla. A pair of PDL processes communicate according to any PDL. For example, PDL processes 226 and 242 cooperate to assemble and disassemble messages according to the PCL language. PDL processes 226 and 242 provide the in-bound and out-bound functions that convert data structures to and from port monitor 224 into and out of messages that comply with a PDL.

A communication stub is any process that provides the lowest level protocol functions that support packet data communication. For example, communications stub processes 228 and 240 employ conventional techniques to communicate data across a conventional electrical interface, for example, link 113 between PC 110 and printer 112. Communications stub processes support conventional data communication by providing physical and electrical signaling protocols that support message passing functions including signal discrimination, packet checking, retransmission procedures, and acknowledgment procedures.

A print pipe in a printer receives data describing what is to be printed and operates a print engine (not shown) for producing marked media in response. Conventional print pipes include techniques for improving the quality of the printed image such as edge enhancement, dot shifting for higher apparent resolution, accommodation of the expected and measured physical aspects of the print engine such as mechanical positions, current temperatures, current voltages, and accommodation of expected and measured aspects of the media. For example, print pipe 243 includes render process 246, rasterize process 248, and print process 250.

Render process 246 and rasterize process 248 perform rendering and rasterizing functions respectively within the context of laser printing in a manner similar to processes 208 and 210 discussed above in the context of displaying. Render process 246 produces a bit-map image data structure for rendering a page at a time or, if desired, for rendering a band at a time. Raster process 248 converts the image data structure to scan lines for printing by process 250. If desired, processes 246 and 248 may be combined by conventional techniques to reduce the amount of memory needed to retain image data structures.

A print process receives data from a communication process and operates any conventional media marking mechanism including electro-photographic printing, laser printing, scanned or vector driven optical imaging onto film, and ink jet printing. For example, print process 250 operates a laser printing mechanism by receiving scan lines from communications process 241 and directing laser printing operations for producing paper bearing the desired image. For full color printing, scan lines may be grouped by primary color in the conventional manner or provided simultaneously for high speed color printing.

An access process is any process that exposes functions across a link. For example, access process 253 exposes classes of functions in printer 112 for the purpose of facilitating evolving printer functions. Access process 253 includes print peer 256 and native proxy 258.

PDL process 242, render process 246, and rasterize process 248 are examples of processes that include evolving functions as indicated by the ellipsis shown in FIG. 2. These processes each include executable program code located within the program address space of the printer's computing circuit, interpretable program code or data structures located within the data address space of the printer's computing circuit, or a combination of both executable and interpretable code. A function, implemented in executable or interpretable code, evolves according to the present invention when it is modified by replacing, extending, supplementing, or conditionally modifying its operations. Such modification is facilitated, for example, by an object oriented run-time environment having dynamic binding of objects.

Functional evolution may be better understood in light of the following brief overview of object-oriented programming concepts, including classes, objects, interfaces, and dynamic binding. Concepts and terminology used to describe software systems 200, 300, and 400 are intended to be consistent with current research, industry standards, and the conventions of the current major manufacturers and developers of computer systems and software.

Figure 6A:
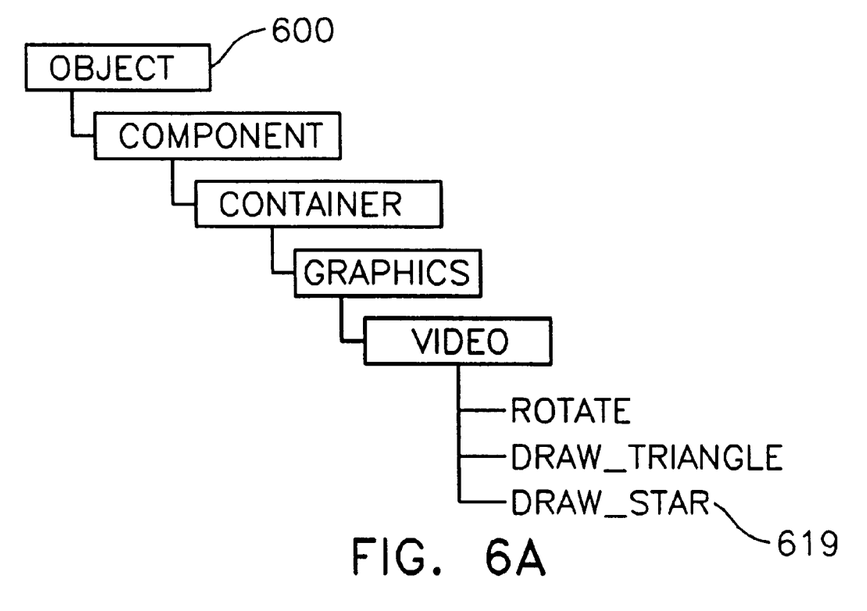
FIGS. 6A, B, and C are class hierarchy diagrams for a printer program in one embodiment of the present invention.
Figure 6B:
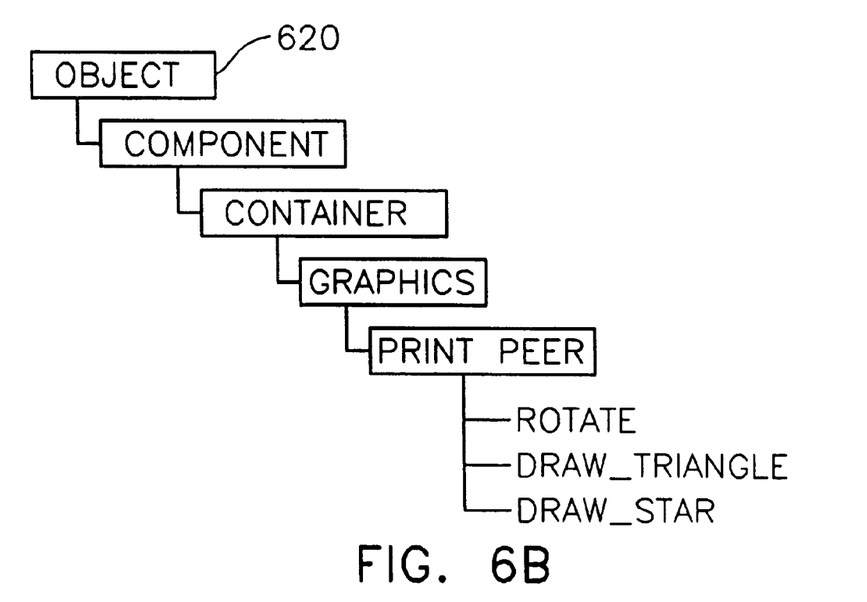
Figure 6C:
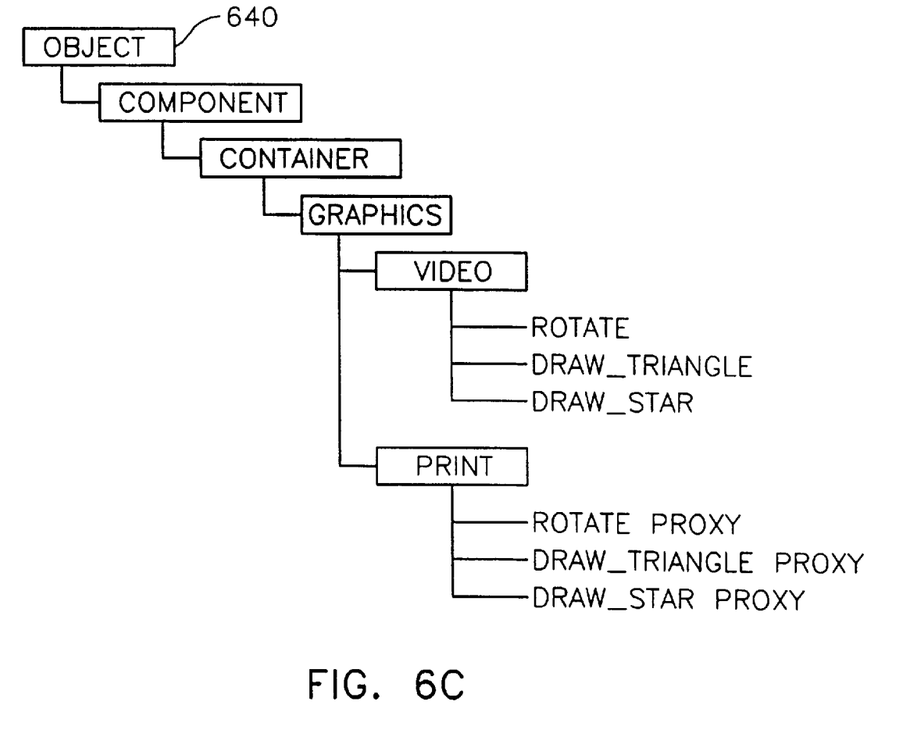

A class is any template used to define one or more objects. A class is defined in source code using the syntax of an object oriented programming language, such as Java, C++, Smalltalk, or Eiffel. A class specifies at least three types of components: variables, methods that operate on the variables, and interfaces. Classes are conventionally defined in a hierarchy, as shown for example, in FIG. 6A. The hierarchy provides for method sharing and functional evolution.

An object is any instance of a class from which it was defined. Objects come into existence by instantiation during run-time. Instantiation of a child object involves allocation and initialization of data memory for the storage of variables and pointers for the child object as well as storage of variables and pointers defined by all parent objects above the child in the class hierarchy.

The object oriented programming language in cooperation with class loading and dynamic linking supports modification of a class hierarchy during run-time. For example, a base class may be used to define a derived class wherein the derived class includes (a) additional methods for objects that were already defined in the base class (overloading), new substitute methods to be used in place of methods defined in the base class (overriding), (c) new objects that utilize (inherit) methods already defined, (d) alternate hierarchical relationships among already defined objects so that method inheritance during dynamic linking is modified, or (e) any combination of these techniques. A modified class provides functional evolution when an object of the modified class is instantiated and dynamically bound.

A class defines methods by defining for each method a specification and possibly an implementation. The specification includes a signature and provisions for exceptional conditions which may arise when the method is performed (such as overflow, etc.). The signature includes a name for the method, the names and types of its arguments, and the type of its return value (if any). The implementation of a method (interpretable or executable code) has one or more entry points, i.e. memory addresses or offsets that identify where performance (execution or interpretation) will commence. When the specification is not accompanied by an implementation, the method is called a virtual function. Objects defined in classes that derive from an interface cooperate at run-time via pointers collectively called a virtual function table. In some run-time environments, a virtual function table is one of the data structures that is allocated when an object is instantiated. A virtual function table includes pointer variables for entry point values determined at run-time, pointer constants when offsets to entry points can be predicted at compile-time, or a combination of variables and constants.

Any association of a particular method with an object is called binding. Binding, when accomplished at least in part at run-time is called dynamic binding. When a method of a particular object is dynamically bound, an entry point value is assigned to an appropriate pointer variable in a virtual function table of the particular object. Thereafter, an indirect reference through the virtual function table initiates performance of the method. The determination of which entry point is appropriate for the method is accomplished by comparing the signature (or simply the name) of the method with signatures (or names) of all methods in the class hierarchy (beginning with the particular object) until the first match is found. By choosing the first match regardless of the possibility of other matches which may exist in the class hierarchy, the behavior of the particular object exhibits polymorphism by overriding, overloading, or sharing by inheritance the behavior of other objects.

An object oriented run-time environment supports run-time polymorphism, for example, by direct execution or by interpretation. For example, software systems 200, 300, and 400 include an object oriented run-time environment including executable program files developed in the C and C++ programming languages and a real time operating system. Further, print peer 256 includes a class loader and a conventional Java Virtual Machine (JVM). The class loader recognizes class definitions developed in the conventional Java programming language and prepares them for interpretation by the JVM. The JVM performs printer peer functions by instantiating objects described by classes (loaded by the class loader) and performing methods of the instantiated objects. Before a method of an object can be performed the method must be associated with an entry point. The process of such association includes conventional dynamic binding either at the time an object is instantiated or immediately before a particular method of the object is to be performed.

Access process 253 cooperates with broker stub processes 252 and 254 to expose printer functions of printer 112 for use by PC 110 and to expose functions of PC 110 for use by printer 112. PDL process 242 includes classes of objects with implementations in interpretable program code (bytecode). Render process 246 and rasterize process 248 include legacy subroutines in executable program code developed without the benefit of an object oriented programming language. Native proxy 258 identifies the entry points in processes 246 and 248 to provide a legacy class interface, similar in format to the class interfaces provided by the specifications in classes of PDL process 242. Consequently, printer peer process 256 is able to make uniform reference to classes of PDL process 242, as well as classes of legacy processes 246 and 248.

A broker stub is any process that provides object resource brokering. For example, broker stub processes 252 and 254 include any conventional object resource brokering facility, for example, brokering facilities developed from or compliant with techniques of remote procedure call (RPC), remote method invocation (RMI) as marketed by JavaSoft, Inc., the CORBA standard as defined by Object Management Group (an industry consortium), or the distributed common object model (DCOM) marketed by Microsoft, Inc. Such a brokering facility includes broker message transfers for (a) identification of classes in another member of a network, (b) transfer of a class definition (data structure) between members of a network, and (c) notification of exceptional conditions (network node unavailable, class not found, etc.). In addition, brokering involves allocating memory for receiving a class definition, cooperating with a class loader for integrating the class definition into the receiver's class hierarchy, and cooperating with a virtual machine for instantiation of objects of the class definition, dynamic binding of methods and performance of methods according to the class definition. When knowledge of a method signature has been communicated to another member of a network, the method is said to be exposed. The receiving member is then enabled to utilize the method for its independent purposes by performing the copy of the implementation received during the course of object resource brokering. Public methods of any process in PC 110 are exposed by broker stub process 252 so that, for example, a method of render process 208, rasterize process 210, PDL process 226, or any other useful method is made available to printer 112.

A second distributed processing application program is any program that facilitates evolving functions for printers that are supported by a print server. For example, software system 300 of FIG. 3 facilitates evolving functions for printers 124 and 134 as supported by server 126. Software system 300 is similar to software system 200 wherein processes of software system 300 are functionally and structurally identical to similarly named counterparts numbered less 100 in software system 200, except as described below.

Software system 300 includes a suite of component processes and data items in PC 120 and printers 124 and 134. In PC 120, software system 300 includes graphical user interface (GUI) 302, user program 304, video pipe 305, PC print driver 372, PC font data 314, and PC communication process 373. In server 126, software system 300 includes communication stub process 378, operating system print pipe 325, server print pipe 317, and communication process 331. In printer 124 (and similarly in printer 134, not separately shown), software system 300 further includes printer communication process 341, printer font data 344, printer print pipe 343, and access process 353.

Functions of print driver 220 in software system 200 are divided between PC print driver 372 and server print driver 382 in any convenient manner. For example, PC print driver 372 provides data in a common format to be communicated to server print driver 382. Server print driver 382, executing on server 126, performs those functions unique to printer 124 or 134 and other operations so as to lessen the computational burden on PC 120. PC print driver 372 cooperates with communication stub 378 to route data in common format to either OpSys print pipe 321 or to print pipe 317.

Communication stub processes in software system 300 provide any suitable protocol support for network and dedicated links. For example, process 376 and 378 support link 121, shown in FIG. 1, processes 383 and 340 support link 123 for printer 124 and link 133 for printer 134, not shown. Link 133 may be either a network link (for uniformity) or a dedicated link (for security, speed, or maintenance purposes). Link protocols include, for example, ethernet, Transmission Control Protocol/Internet Protocol (TCP/IP), Hypertext Transfer Protocol (HTTP), and SNMP as discussed above. In a variation of links 123 and 133, additional (alternate or layered) link protocols are implemented using conventional techniques.

Broker stub processes in software system 300 provide object resource brokering of the type described for software system 200. For example, resource brokering in software system 300 exposes functions of printers 124 and 134 to server 126 and to PC 120 and exposes PC functions to server 126 and printers 124 and 134.

In software system 300, server print driver 382 also exhibits functional evolution in a manner similar to the functional evolution described with reference to software system 200. For example, classes from PC print driver 372 may be transferred to server 126 to provide or modify server print driver 382.

A third distributed processing application program is any program that facilitates evolving functions for printers that initiate or maintain a link without user interaction. For example, software system 400 of FIG. 4 facilitates evolving functions for printer 144 as supported by server 126. Software system 400 is similar to software systems 200 and 300 wherein processes of software system 400 are functionally and structurally identical to similarly named counterparts numbered less 200 in software system 200, and less 100 in software system 300 except as described below.

Software system 400 includes a suite of component processes and data items in server 126 and printer 144. In server 126, software system 400 includes site manager 485, page bank 484, page pipe 419, and communication process 429. In printer 144, software system 400 includes communication process 445, printer print pipe 417, print pipe 487, and access process 453.

A site manager any process identified by a network address for providing data across a link. For example, site manager 485 is a conventional site manager, identified by a uniform resource locator (URL) that receives requests using HTTP and responds by transmitting a "page" as a message or file, compliant with the Hypertext Markup Language (HTML). Data is requested by conventional techniques including specification of a full address, a partial address, a set of search criteria, or as a result of a link from a previously identified page. Data transfers are accomplished by conventional techniques, for example, TCP/IP. In addition, site manager process 485 includes any conventional network management capability, for example the capability to operate as a file server, a database system, or a member of the internet or of the world wide web.

A page pipe provides data to a queue in a manner analogous to a simple print pipe, such as print pipe 317. For example, page pipe 489 includes page driver 486 which provides data to queue 422. A page driver provides any format-independent page-queuing capability. For example, page driver process 486 provides an HTML file generator and queue manager. When page bank 484 includes one or more pages already in HTML format, page driver merely queues the requested page(s). Otherwise, a message in HTML is formulated from data from page bank 484, or system information, such as information provided by site manager program 485, broker stub 474, or the server operating system, not shown.

Communications process 429 is an analogous simplification of communications process 229 discussed with reference to FIG. 2. Process 429 includes port monitor 424, communication stub 428 and broker stub process 474. A page description language process is omitted from communication process 429 because page driver 486 provides data in HTML format and support for TCP/IP is provided by communication stub 428. Broker stub process 474 is similar in structure and function to broker stub 252 discussed with reference to FIG. 2. Broker stub process 474 provides access to exposed methods (if any) of site manager 485, page driver 486, or server operating system, not shown.

Communication process 429 cooperates with communication process 445 to support link 140. Communication process 445 includes communication stub process 440, site poll 488, and broker stub 454. A site poll process is any browser or file transfer agent capable of initiating requests for data across a link. For example, site poll process 488 includes any conventional network browser or file transfer agent and, if desired, includes a browser of the type marketed by Microsoft or by Netscape together with a shell or script that invokes a request for a predetermined page (or search criteria) at a predetermined time of day, without manual intervention by a user.

Communication stub processes 428 and 440, and broker stub processes 474 and 454 include conventional data communication and object resource brokering capabilities, as described above, for exposing printer 144 functions to server 126 and for exposing server 126 functions to printer 144.

Components of a distributed processing application program occupy memory of a PC, server, or printer, as discussed above and generally illustrated by a memory map. For example, memory map 500 of FIG. 5, generally corresponds to a portion of memory of any one printer 112, 124, 134, or 144 in one embodiment of the present invention. Map 500 includes appropriate components of software systems 200, 300, or 400. The address space of nonvolatile memory 510 includes firmware operative when power is applied. Space 520 includes any printer operating system kernel having an object oriented run-time system. If desired, the system kernel includes the communications stub 240, 340, 440 firmware, an embedded operating system of the type marketed as VxWorks by Wind River Systems, Inc., a class loader, and a Java virtual machine (JVM). The JVM includes a conventional processor (firmware and/or hardware) of the type providing just-in-time compilation. Printer processes such as print processes 250, 350, and 450 occupy space 522 (print engine control). Render and rasterize processes 246, 248, 346, 348, 446, and 448 occupy space 524 (formatter).

Figure 5:
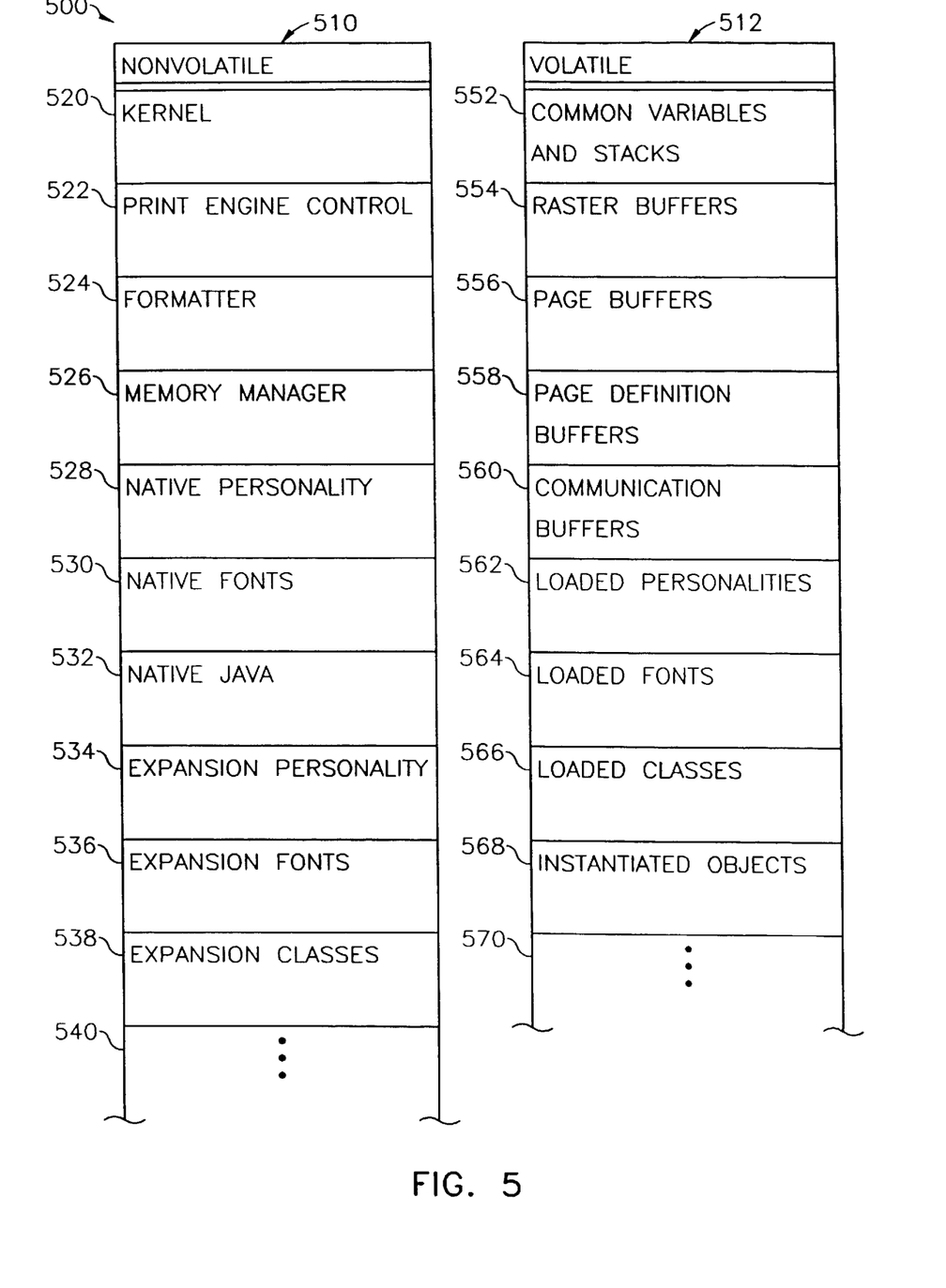
FIG. 5 is a memory map of the address space of a computing circuit in a printer in one embodiment of the present invention.

A memory manager process occupies space 526. A memory manager includes any conventional firmware for identifying downloaded items such as personalities 562 and fonts 564 and for performing garbage collection (deallocation of nonreferenced memory) in spaces 562 through 570.

Spaces 528, 530, and 532 are reserved for built-in (i.e. native) functions. PDL process 242 or 342 (personality) is built-in. Fonts 244, 344, and 444 are built-in. And, classes implementing portions of the kernel, class loader, Java virtual machine, native proxy (258, 358, 458), printer peer (256, 356, 456), and broker stub (254, 354, 454) are built-in.

Address spaces 534, 536, 538, and 540 are reserved for the installation of memory devices programmed for nonvolatile expansion capabilities including additional personalities (PDL capabilities), fonts, and Java classes, such as classes for site poll and print driver processes 488 and 420 in printer 144.

The address space of volatile memory 512, for the embodiment discussed above, includes areas to be initialized after power is applied. Space 552 is reserved for common variables and stacks used primarily by kernel firmware. Page definition buffers 558 include working memory for intermediate format items provided by PDL process 242, 342, or queue 422. Page buffers 554 include working memory for pixel arrays identified as image data provided by render process 246, 346, or 446. Raster buffers 552 include working memory for a page or band of scan lines provided by rasterize process 248, 348, or 448. Communication buffers in space 560 support memory allocated by communication stub 240, 340, or 440 and broker stub 254, 354, or 454.

Spaces 562, 564, and 566 illustrate the possibility of downloading any combination of personalities (PDL support processes), fonts, and Java classes via a conventional page description language data transport mechanism or via the broker stub mechanism described above. When a particular loaded item is not currently referenced, garbage collection will permit the memory used by that item to be reused. Fragmented memory address spaces are coalesced by the garbage collection process to permit larger contiguous address spaces to be available for downloaded items and instantiated objects.

Space 568 illustrates memory for instantiated objects including space for variables, virtual function tables, and other data structures. Pointer values in virtual function tables in volatile memory area 568 are set by dynamic binding to entry point (e.g. physical address) values of method implementations stored in nonvolatile memory (e.g. in spaces 524, 528, 532, 534, and 538) and/or volatile memory (e.g. in spaces 562, 566, and 568).

An evolving printer responds to modified class definitions. For example, evolving printer 112, 124, 134, or 144, in one embodiment, responds to a modified class definition as shown in the hierarchy diagrams of FIGS. 6A, B, and C. A modified class definition is prepared and used for printing according to a method of the present invention illustrated as follows with reference to FIG. 2:

1. Upon recognition of the need to inquire into currently available printer functions (built-in or as installed), print driver 220 passes a request by class name through brokers 252 and 254 for the signature of all methods in class:

Object.Component.Container.Graphics.PrintPeer

2. Print peer 256, aware of the possibility that video methods could be useful, passes a request by class name through brokers 254 and 252 for the signature of all methods in class:

Object.Component.Container.Graphic.Video class

3. Broker 252 responds with class definition 600 that includes public methods Rotate, Draw_Triangle (equilateral), and Draw_Star (6-point star) exposed from render process 208;

4. Print peer 256 creates a modified class definition 620 that includes a copy of the implementations of the public methods received in class definition 600. These implementations are assumed to relay on atomic methods such as Draw_Line that would be inherited appropriately from the PrintPeer object or from the Video object. The class loader places the class in address space 566 of volatile memory, see FIG. 5;

5. Print peer 256 creates a modified class definition 640 that includes a proxy for each shared method of class 600 (Each proxy generates the appropriate PDL command to invoke the underlying PrintPeer method);

6. Broker 254 returns modified class definition 640 to broker 252, enabling user program 204 to efficiently print a star image item;

7. On receipt of a PDL command directing the generation of a star image item, render process 246 makes reference to PrintPeer.Draw_Star of class definition 620;

8. A PrintPeer object of the class 620 is instantiated;

9. Dynamic binding of the instantiated object directs program flow for the Draw_Star method to the Draw_Triangle and Rotate methods (i.e. pointers are assigned addresses in region 566);

10. Dynamic binding of the instantiated object directs program flow for the atomic Draw_Line method (needed for Draw-Triangle) to the built-in Draw_Line method (i.e. pointers are assigned addresses in region 524); and 11. Render process 246 generates the star image using the Java virtual machine interpretation of the received Draw_Star implementation and the native legacy code of region 524. The code in region 524 implements Draw_Line in a manner that accounts for physical attributes of the print engine including accommodation for neighbor pixels, for example edge enhancement technologies.

Printing a WYSIWYG image according to another method of the present invention includes the steps of:

1. Invalidating the contents of a displayed (or displayable) frame (a container class object);

2. Directing output of a screen repaint object to the print pipe supporting evolving printer functions, for example by creating an alternate reprint derived object under class: Object.Component.Container.Graphics.PrintPeer (thus inheriting an atomic level print output method); and 3. Activating the alternate reprint object thereby printing the image.

The foregoing description discusses preferred embodiments of the present invention, which may be changed or modified without departing from the scope of the present invention. For example, program code that includes instructions to perform a printer function may be stored in any conventional memory device including an EEPROM, EPROM, ROM, CDROM, or magnetic hard disk, flexible disk, or tape. Such media includes indicia of instructions in any format including compressed and secure formats. A printer function includes any process relied upon to produce printed output, for example print peer process 256, 356, or 456, communications processes, rendering and rasterizing (formatting) processes, and etc., as described herein, and conventional functions as known in the art.

These and other variations and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other variations of the invention will be apparent in light of the disclosure and practice of the invention to one or ordinary skill in the art to which the invention applies.

What is claimed is:

1. A data storage medium having recorded indicia comprising instructions for performing on a provided printer a first method for functional evolution of the printer coupled to a provided computer, the printer having a printer function, the first method comprising;

receiving at the printer a class definition comprising a second method;

forming an object instance in response to the class definition; and binding the object so that the printer function is performed according to the second method, thereby accomplishing functional evolution.

2. The medium of claim 1 wherein the method further comprises requesting the class definition.

3. The medium of claim 1 wherein the printer further comprises a first class definition having a first class name and the step of requesting comprises the first class name.

4. The medium of claim 1 wherein the first class definition comprises a first method implementing the printer function, and the binding overrides the first method.

5. The medium of claim 2 wherein the request conforms to a protocol comprising at least one of SNMP, hypertext transfer protocol, page description language, remote procedure call, remote method invocation, and CORBA.

6. The medium of claim 1 wherein the class definition is received in a protocol comprising at least one of SNMP, hypertext markup language, page description language, remote procedure call, remote method invocation, and CORBA.

7. The medium of claim 5 wherein the printer function comprises instructions for receiving data at the printer.

8. The medium of claim 1 wherein receiving comprises a method compliant with a page description language.

9. The medium of claim 1 wherein receiving comprises a method compliant with a network management protocol.

10. A data storage medium having recorded indicia comprising instructions for performing a method for providing access to a printer function, the method comprising transmitting a class definition from the printer, the class definition comprising an identification to the printer function.

11. The medium of claim 10 wherein the method further comprises executing the printer function in response to receiving a message comprising the identification.

12. A method of printing on a printer, the printer comprising a first class definition having a function, the method comprising:

a. exchanging a second class definition between the printer and a computer;

b. instantiating at the printer an object of the second class definition;

c. binding the object so that the function is performed when reference is made to the object; and d. printing in response to the performance of the function.

13. The method of claim 12 wherein exchanging comprises transferring the second class definition to the printer.

14. The method of claim 12 wherein exchanging comprises transferring the first class definition to the computer.

15. The method of claim 12 wherein exchanging comprises requesting by the computer for the first class definition.

16. The method of claim 12 wherein exchanging comprises requesting by the printer for the second class definition.

17. The method of claim 12 wherein the second class definition comprises a method for processing according to a page description language.

18. The method of claim 12 wherein the second class definition comprises a method for forming an image in a data structure.

19. A computer system comprising:

a. a computer having stored indicia of a method for processing images to be displayed on a provided monitor, wherein the computer forms a class definition in response to the indicia and transmits the class definition; and b. a printer comprising a class loader, the printer for receiving the class definition, for performing the method, and for printing in response to the method.

20. The computer system of claim 19 wherein the class definition is compliant with a syntax comprising at least one of ANSI C, ANSI C++, and JAVA.

* * * * *